(12) United States Patent
Wobak et al.

(10) Patent No.: US 12,407,195 B2
(45) Date of Patent: Sep. 2, 2025

(54) METHOD AND DEVICE FOR PERFORMING A PRESENCE CHECK FOR WIRELESS CHARGING LISTENER DEVICES

(71) Applicant: NXP B.V., Eindhoven (NL)

(72) Inventors: Markus Wobak, Graz (AT); Erich Merlin, Gratkorn (AT); Ulrich Neffe, Albersdorf-Prebuch (AT)

(73) Assignee: NXP B.V., Eindhoven (NL)

( * ) Notice: Subject to any disclaimer, the term of this patent is extended or adjusted under 35 U.S.C. 154(b) by 312 days.

(21) Appl. No.: 17/936,926

(22) Filed: Sep. 30, 2022

(65) Prior Publication Data
US 2024/0113564 A1    Apr. 4, 2024

(51) Int. Cl.
*H02J 50/80* (2016.01)
*H01F 38/14* (2006.01)
*H02J 50/20* (2016.01)

(52) U.S. Cl.
CPC .............. *H02J 50/80* (2016.02); *H01F 38/14* (2013.01); *H02J 50/20* (2016.02)

(58) Field of Classification Search
CPC . H02J 50/80; H02J 50/20; H02J 50/90; H01F 38/14
See application file for complete search history.

(56) References Cited

U.S. PATENT DOCUMENTS

| | | | | |
|---|---|---|---|---|
| 8,547,057 B2 * | 10/2013 | Dunworth | ............... | H02J 50/20 320/108 |
| 9,281,706 B2 * | 3/2016 | McFarthing | ............ | H02J 50/10 |
| 9,438,317 B2 * | 9/2016 | Karandikar | ............... | H03F 3/20 |
| 9,660,478 B2 * | 5/2017 | Von Novak | ............. | H02J 50/12 |
| 9,967,650 B2 * | 5/2018 | Chawan | .................. | A45C 11/24 |
| 10,248,899 B2 * | 4/2019 | Kesler | ................ | G06K 19/0726 |
| 10,945,210 B2 * | 3/2021 | Wobak | ...................... | H04B 5/77 |
| 11,476,724 B2 * | 10/2022 | Peralta | ..................... | H02J 50/80 |
| 2009/0284227 A1 * | 11/2009 | Mohammadian | ........ | H04B 5/48 307/104 |
| 2010/0201189 A1 * | 8/2010 | Kirby | ...................... | H02J 50/80 307/104 |

(Continued)

FOREIGN PATENT DOCUMENTS

EP    3863185 A1    8/2021
EP    3890196 A1    10/2021

(Continued)

*Primary Examiner* — Jared Fureman
*Assistant Examiner* — Michael J Warmflash (57) ABSTRACT

A wireless charging (WLC) poller device and WLC listener device are provided. A method for performing a presence check of the WLC listener device includes providing a radio frequency (RF) presence check signal. An input signal from the antenna by the poller device is received concurrently with the transmission of the RF presence check signal. A rate of change of a magnitude of the input signal is measured during the transmission of the presence check signal. A difference between the input signal and an expected input signal is determined. A presence of the listener device is detected if an absolute value of the measured rate of change of the input signal is above a threshold rate of change, and the difference between the input signal and the expected input signal is within a predetermined distance. Prior to the presence check, a capacitor of the WLC listener device may be discharged.

21 Claims, 5 Drawing Sheets

(56) References Cited

U.S. PATENT DOCUMENTS

| | | | | |
|---|---|---|---|---|
| 2010/0201311 A1* | 8/2010 | Lyell Kirby | .............. | A61L 2/02 |
| | | | | 320/108 |
| 2010/0201314 A1* | 8/2010 | Toncich | .................. | H02J 50/20 |
| | | | | 320/108 |
| 2010/0207572 A1* | 8/2010 | Kirby | ..................... | H02J 50/05 |
| | | | | 320/108 |
| 2010/0289341 A1* | 11/2010 | Ozaki | ..................... | H02J 50/12 |
| | | | | 307/104 |
| 2011/0053500 A1* | 3/2011 | Menegoli | ................. | H04B 5/79 |
| | | | | 455/41.1 |
| 2011/0115431 A1* | 5/2011 | Dunworth | .............. | H02J 50/20 |
| | | | | 320/108 |
| 2014/0091634 A1* | 4/2014 | Mayo | ...................... | H04B 5/79 |
| | | | | 307/104 |
| 2018/0236879 A1* | 8/2018 | Elshaer | ................... | H02J 50/90 |
| 2020/0064920 A1* | 2/2020 | Soltani | ..................... | H04B 5/72 |
| 2021/0159737 A1* | 5/2021 | Shichino | ................. | H02J 50/12 |
| 2021/0408840 A1* | 12/2021 | Peralta | .................... | H02J 50/20 |

FOREIGN PATENT DOCUMENTS

| | | | |
|---|---|---|---|
| EP | 3447875 | B1 | 3/2022 |
| FR | 3040226 | B1 | 6/2018 |
| WO | 2006018231 | A1 | 2/2006 |
| WO | 2010020895 | A2 | 2/2010 |

\* cited by examiner

METHOD AND DEVICE FOR PERFORMING A PRESENCE CHECK FOR WIRELESS CHARGING LISTENER DEVICES

BACKGROUND

Field

This disclosure relates generally to electronic circuits, and more particularly, to a method and device for performing a presence check for wireless charging listener devices.

Related Art

The use of wireless energy harvesting based on RF technology is becoming more widely used to power electronic devices and to charge batteries. Example devices include near field communication (NFC) and radio frequency identification (RFID) devices. Wireless charging using NFC is a deployed technology for small accessory charging. Small accessories include, for example, wearables, human interface devices, and audio device. Implementations can follow the NFC Forum Wireless Charging (WLC) specification, or a proprietary system based on legacy NFC communication schemes.

A system for wireless charging consists of a primary device, typically referred to as a "WLC poller", magnetically coupled to a secondary device, typically referred to as "WLC Listener". The secondary device is battery powered which can be recharged by the primary device using RF coupling. Note that the primary device may be battery powered. The primary device, e.g., a reader, may use a technique called low power card detection (LPCD) to perform a presence check to poll for counterpart devices. LPCD uses short RF "pings" to sense small load changes to identify tags or smartcards in far distance. In small WLC devices such as small accessories, e.g., a stylus for a pad or ear buds, there is needed a low power, robust, sensitive, RF presence checking method to detect WLC listener devices in the proximity of a WLC poller device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a system including a WLC poller device and a WLC listener device that provides efficient and low power presence checking. A RF presence check signal (ping) is broadcast from an antenna of the WLC poller device. At the same time, an input signal on the antenna is sampled by the WLC poller device concurrently with the transmission of the RF presence check signal. A WLC listener device in close proximity (closely coupled) to the WLC poller device will influence the input signal. A rate of change of a magnitude of the input signal is measured during the transmission of the presence check signal. A difference between the input signal and an expected input signal is determined. A presence of the WLC listener device is detected if the measured rate of change of the input signal is above a threshold rate of change, and the difference between the input signal and the expected input signal is within a predetermined distance. To aid in detecting the WLC listener device and to reduce false detections, an attenuator of the WLC poller device may be adjusted. Also, the attenuation may be adjusted during operation to provide uniform gain at the antenna. When WLC charging is complete and the WLC listener device is withdrawn from the proximity of the WLC listener device, a buffer capacitor of the WLC listener device is rapidly discharged before another RF presence check can start. Discharging the buffer capacitor ensures presence check pings have a more uniform magnitude, and thus more sensitive detection of WLC listener devices. The more sensitivity may allow a WLC listener device to be identified based on changes in the input signal during the presence check ping with fewer false detections.

In one embodiment, the disclosed method, WLC poller device, and WLC listener device provide for a robust, sensitive, and low power RF presence check for, e.g., small WLC devices such as small accessories, e.g., a stylus for a pad computer or ear buds. In one embodiment, the RF power transmission and RF communication use a carrier frequency of 13.56 megahertz (MHz).

In accordance with an embodiment, there is provided, a method for performing a presence check of a wireless charging (WLC) listener device by a WLC poller device, the method including: transmitting a radio frequency (RF) presence check signal at an antenna of the WLC poller device; sampling a input signal from the antenna by the WLC poller device concurrently with the transmission of the RF presence check signal; measuring a change of a magnitude of the input signal during the transmission of the presence check signal; determining a difference between the input signal and an expected input signal; and detecting a presence of the WLC listener device if the measured rate of change of the input signal is above a threshold rate of change, and the difference between the input signal and the expected input signal is within a predetermined distance. The method may further include configuring an attenuator in a receiver circuit of the WLC poller device to provide uniform gain from the antenna. The method may further include adapting attenuation of a receiver circuit in the WLC poller based on a gain of the input signal. The method may further include discharging a capacitor in the WLC listener device before the RF presence check signal is transmitted. Determining a difference between the input signal and an expected input signal may further include determining a difference between an average of input signals and an expected average of input signals. The method may further include: determining that the WLC listener device is present; wirelessly charging the WLC listener device with the WLC poller device; detecting completion of the wireless charging; separating the WLC poller device and the WLC listener device to end the wireless charging; detecting removal of an input signal from a capacitor of the WLC listener device; and in response to detecting removal of the input signal, shorting first and second terminals of a capacitor through a switch to discharge the capacitor prior to transmission of another RF presence check signal. The method may further include identifying a WLC listener device by detecting the change in the input signal on the antenna during transmission of the presence check signal. The method may further include storing the input signal for use as the expected input signal in response to detection of the presence of the WLC listener device. The RF presence check signal and the input signal may include complex vectors.

In another embodiment, there is provided, a wireless charging (WLC) poller device including: a transmitter circuit coupled to an antenna, the transmitter circuit configured to transmit a radio frequency (RF) presence check via the antenna; a receiver circuit coupled to the antenna, the receiver circuit configured to sample an input signal at the antenna concurrently with the transmission of the presence check; a control circuit coupled to the transmitter circuit and to the receiver circuit, the control circuit measures a rate of change of a magnitude of the input signal during the transmission of the presence check signal, determines a difference between the input signal and an expected input signal, wherein a presence of the WLC listener device is detected if the measured rate of change of the input signal is above a threshold rate of change, and the difference between the input signal and the expected input signal is within a predetermined distance; and a memory coupled to the control circuit. An attenuation of the receiver circuit may be configured to provide uniform gain of input signals at the antenna. An attenuation of the receiver circuit is adapted based on a gain of the input signal. The RF presence check signal and the input signal may be expressed as complex vectors. The WLC listener device may be identified by detection of a change in a input signal on the antenna during the transmission of the presence check signal. The WLC poller device may provide wireless charging according to a near field communication (NFC) protocol.

In yet another embodiment, there is provided, a wireless charging (WLC) listener device including: a receiver circuit coupled to an antenna, the receiver circuit configured to be coupled with a WLC poller device via the antenna; a rectifier circuit having an input coupled to the receiver circuit, the rectifier circuit configured to convert a radio frequency (RF) signal from a WLC poller device to a direct current (DC) voltage at an output of the rectifier circuit, wherein a capacitor is coupled between the output of the rectifier circuit, and a reference terminal; a switch having a first terminal coupled to the output of the rectifier circuit, and a second terminal coupled to the reference terminal; and a control circuit coupled to control operation of the WLC listener device, wherein a battery coupled to the WLC listener device is charged in response to the WLC poller device receiving a favorable response to an RF presence check signal and the WLC listener device being within a charging range, and wherein in response to the WLC listener device detecting withdraw of the WLC poller device from within the charging range, the control circuit causing the switch to discharge the capacitor before the WLC poller device transmits another RF presence check signal. The device may be implemented on one or more integrated circuits. The device may communicate with the WLC poller device using a near field communication (NFC) protocol. The RF presence check signal may be expressed as a complex vector. A charging curve of the capacitor may be used by the WLC poller device to identify the WLC listener device.

In addition to environmental and thermal considerations, end-to-end power efficiency is a system parameter for WLC system implementations. High coupling factors between WLC poller and WLC Listener devices in the range of 0.15 to 0.6 are typically found to achieve good power transfer efficiency. This causes a strong loading effect and the WLC poller's RF interface matching is selected to consider mounted accessory position. Note that there may also be other unsupported devices and metal objects in the proximity of WLC Poller device during presence checking as well as wireless charging.

Initially, the WLC poller device is in a discovery mode to detect a supported accessory device being mounted before starting a wireless charging activity and two-way NFC communication. After completion of charging, the WLC poller device checks for removal of the accessory or if there is a need for topping off the charge.

Figure 1:
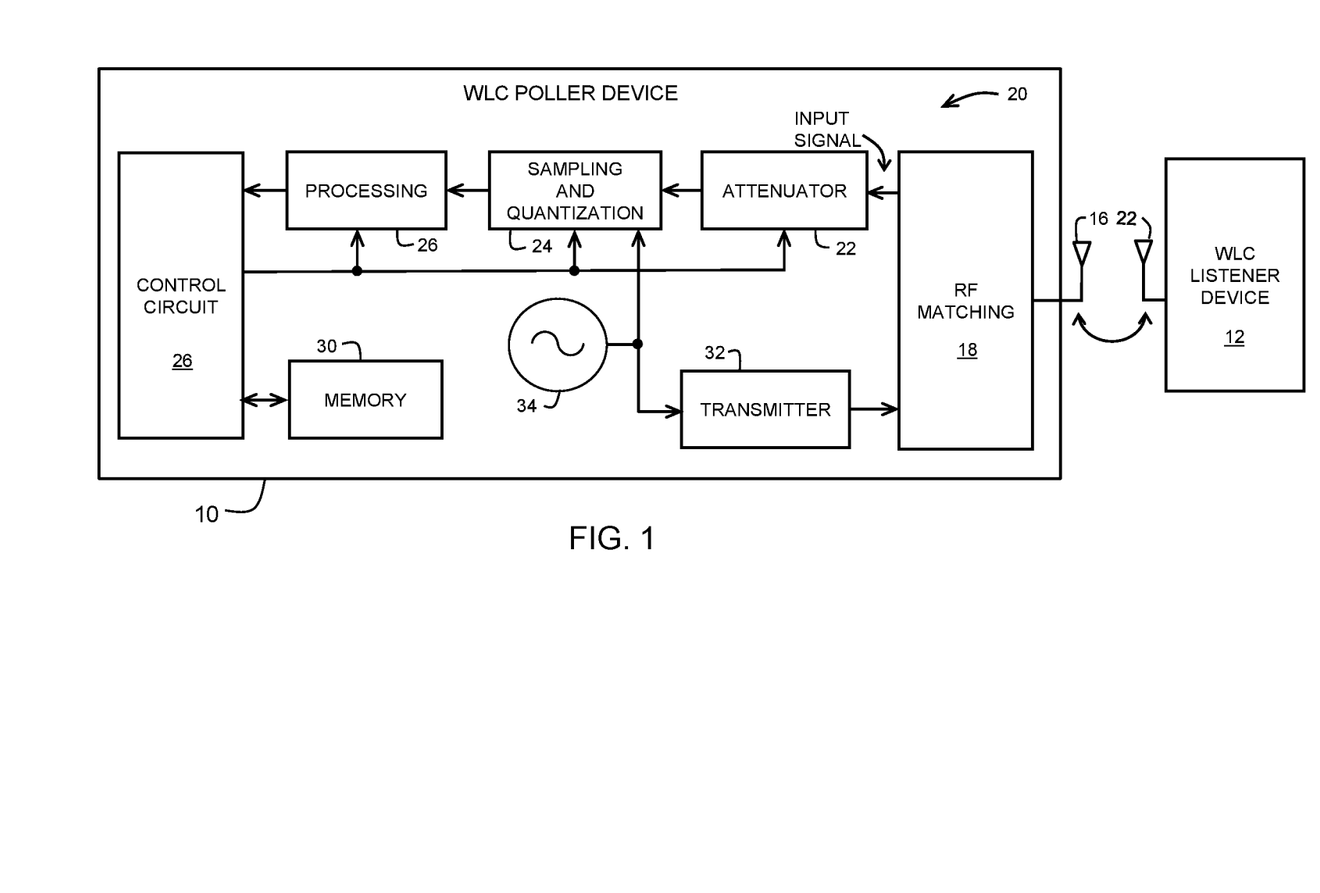
FIG. 1 illustrates a WLC poller device closely coupled with a WLC listener device in accordance with an embodiment.

FIG. 1 illustrates WLC poller device 10 with closely coupled WLC listener device 12 in accordance with an embodiment. WLC poller device 10 and WLC listener device 12 may each be implemented on one of more integrated circuits. Generally, WLC poller device 10 and WLC listener device 12 are closely coupled with each other when they are relatively close to each other. WLC poller device 10 includes receiver chain 20. Receiver chain 20 including attenuator 22, sampling and quantization 24, and processing circuit 26. Control circuit 26 is coupled to control receiver chain 20, which is part of an RF modem having transmitter 32 and receiver chain 20. Control circuit 26 is coupled to memory 30, which may be non-volatile memory such as flash memory, an electrically erasable and programmable read only memory (EEPROM), or the like. Memory 30 may also be a volatile memory such as, e.g., a static random-access memory (SRAM) or dynamic random-access memory (DRAM). Memory 30 may also be multiple memories of different types. RF matching circuit 18 is coupled to an antenna. The antenna may be a loop antenna having one or more loops. Receiver chain 20 and transmitter 32 are coupled to RF matching circuit 18. Frequency source 34 provides a carrier frequency fc of, e.g., 13.56 MHz to sampling and quantization 24 and to transmitter 32. WLC listener device 12 is shown in more detail in FIG. 2.

In presence check mode, the WLC poller device 10 is woken periodically from a power saving state to broadcast one or more presence check pings with transmitter 32. In power saving state only core blocks of WLC poller device 10 stay enabled to maintain system state. WLC poller device 10 may wakeup based on an internal timer or by a trigger from another system (not shown). In some example systems, presence check frequencies may be from one up to ten times per second. Other systems may use a different number of presence check frequencies. Upon being triggered, WLC poller device 10 will activate its RF modem including transmitter 32 and receiver chain 20, and associated power and clock inputs (not shown). In RX receiver chain 20, attenuator 22 damps external signal levels to values in the range of, e.g., −10 to −50 decibels (dB). Sampling and quantization circuit 24 may include signal conditioning, e.g., filtering, gain stages, and DC compensation, which may further improve detection performance. In one embodiment, processing circuit 26 converts a sampled input signal into an equivalent complex receiver input signal metric. It can also compensate for applied attenuation factors to result in a reported uniform gain. Sampling and quantization 24 provides an I/Q demodulator stage as part of receiver chain 20. Control circuit 26 may select a static pre-defined configuration stored in memory 30 for the receiver chain 20. The configuration may be selected to prevent saturation of input signals provided to receiver chain 20, which may cause non-linearities and result in false alarms.

Figure 3:
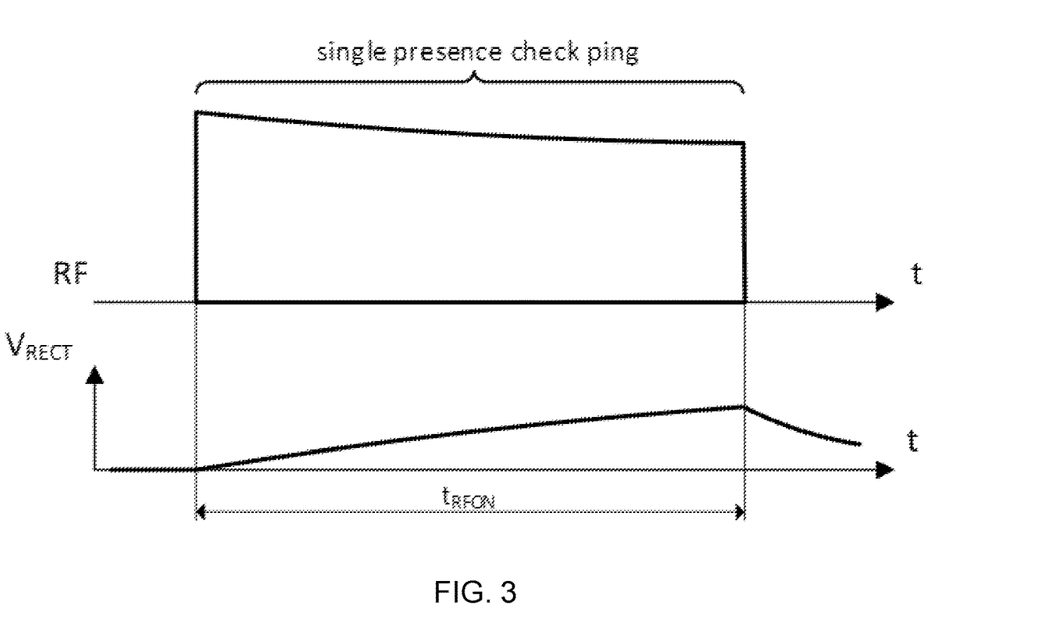
FIG. 3 illustrates a diagram of a single presence check ping from a WLC poller device with a closely coupled WLC listener device.

After wakeup, control circuit 26 configures transmitter 32 to send a short WLC listener presence check ping by sending a burst of unmodulated wave clock cycles with carrier frequency fc (13.56 MHz for existing NFC systems). A typical duration tRFON of the WLC listener presence check ping is 10 to 50 microseconds (μs), which is defined by system settling times (RF matching 18 and antenna 16 forms a resonant RLC circuit). FIG. 3 shows a diagram of a WLC listener presence check ping. Receiver chain 20 monitors input signal levels in RF matching 18. The signal levels of the input signal is also a function of any coupled external device such as WLC listener device 12. The observed input RX signal level strength at antenna 16 may have a large dynamic range for WLC systems. A typical magnitude strength difference between an unloaded condition versus an accessory attached condition can be 20 dB or more. Control circuit 26 analyses the observed signal when an WLC listener device 12 is attached and compares it with an expected value associated with WLC listener device 12. The expected value is saved in memory 30.

To control the large dynamic range, WLC poller device 10 provides dynamic attenuation adaption for presence check pings for WLC listener device 12. Receiver chain 20 features an analog-to-digital conversion (ADC) of the input signal to a defined number of bits NA within a defined fixed sampling full scale range (FSR) which requires quantization provided through sampling and quantization 24. Typical values are 8-to-12-bit conversions with a FSR of 0.5 to 1.8 volts. Thus, quantization defines the resulting signal detection sensitivity by $FSR/2^{N_A}$. Attenuator 22 is used to condition the input signal because observed input signals for WLC systems may vary significantly. In prior presence check systems, a static attenuation setting is used which may be either globally defined or defined at the beginning of a presence check session. This may limit the dynamic range sensitivity of presence checking for WLC listener device 12. Additionally, this may also reduce the robustness as the signal to noise ratio (SNR) of small signals may be reduced due to quantization noise. WLC poller device 10 dynamically adapts the attenuation factor of attenuator 22 for the next presence check poll of WLC listener device 12 based on the observed signal strength of the preceding WLC listener presence check poll. For example, WLC poller device 10 may reduce attenuation for a next poll by a factor of two if the observed input signal magnitude is below FSR/4. Also, WLC poller device 10 may increase attenuation for the next poll by a factor of two if the observed signal magnitude is above FSR/2. A control strategy may be defined based on the above concept. For example, a control strategy may include a control loop circuit controlling attenuator 22 configuration to reach a configurable target ADC code. The configurable target ADC code may be configured close to FSR to reduce quantization effects while still having enough headroom to prevent saturation. Note that processing circuit 28 should compensate the applied attenuation to have a uniform gain for simplified processing.

In one embodiment, WLC poller device 10 can identify a WLC listener device by monitoring the input signal with respect to an input signal range where WLC listener devices are expected. If the input signal is within the range, the input signal is generated from a load resulting from the presence of a WLC listener device. The dynamic attenuation just described provides better sensitivity to make the detection more robust and reliable. Also, a transient change of the signal during single presence check poll can be monitored and used to identify a WLC listener device.

In another embodiment, an input signal resulting from a measurement of a WLC listener presence check poll can be used to identify a WLC listener device if it is close to a known value for a particular WLC listener device. For example, an "average over observed" input signal during single WLC listener presence check poll or an instantaneous value can be used to identify a WLC listener device before commencing RF poll transmission. For example, the processing circuit 26 may consider a single ADC sample at the end as captured for a WLC listener presence check poll. In one embodiment, multiple captured consecutive ADC samples during a single WLC listener presence check poll may be considered to compute a filtered measurement (for example, a filtered moving average) allowing noise suppression to be measured. Implementations can provided to define a presence check input signal level that is influenced by a WLC listener in close proximity. For example, an implementation may compare an instantaneous measurement to a predefined threshold. For example, the magnitude of an observed RX input signal can be compared to a threshold. Alternatively or additionally, the phase of the observed RX input signal can be compared to another threshold. In case one measurement is crossing one detection threshold, WLC poller 10 may identify a current condition as a WLC listener device being present. A configuration value for the input signal level may be saved in memory 30. In an embodiment, earlier observed input signals can be stored in memory. For example, the earlier input signals can be tracked, and the memory updated with the expected measurements to increase detection probability. Note that this is useful for accessory charging systems where the primary device and the accessory are typically used together. Thus, an instantaneous measurement is compared with an expected or earlier seen input signal due to a closely coupled WLC listener device, and the distance between the two is used for identification of a WLC listener device.

Figure 2:
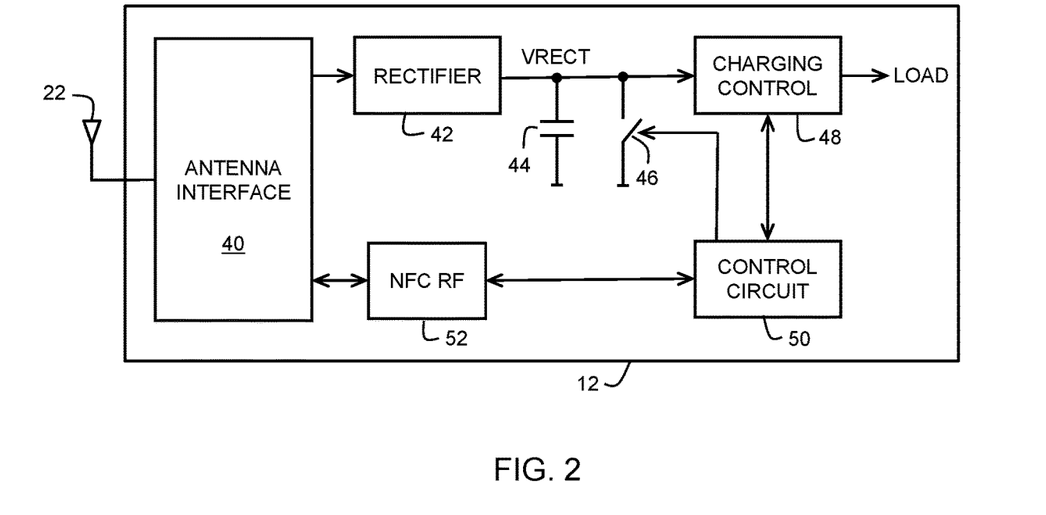
FIG. 2 illustrates the WLC listener device of FIG. 1 in more detail.

FIG. 2 illustrates WLC listener device 12 of FIG. 1 in more detail. WLC listener device 12 includes antenna interface 40, rectifier 42, buffer capacitor 44, switch 46, charging control 48, NFC RF interface 52, and control circuit 50. Antenna interface 40 is connected to antenna 22 and connected to NFC RF circuit 52 frontend for NFC communication purposes. Antenna interface 40 is also connected to a power receiving path, which converts an AC signal from antenna 22 to a DC level using rectifier 42 and blocking capacitor 44. Capacitor 44 may be relatively large and therefore implemented external to WLC listener device 12. The connection node between capacitor 44 and rectifier 42 is labeled VRECT. Charging control circuit 48 is used to supply other circuitry and/or to charge a battery. In one embodiment, the charging control circuit 48 may include a LDO (low drop out) regulator, a DC/DC converter, or a specific battery charger circuit. Also, a combination of LDO and DC/DC converter or DC/DC converter and battery charger may be used. WLC listener device 12 also includes control circuit 50 to interact with WLC poller device 10 via NFC RF interface 52 and charging control circuit 48. NFC RF interface 52 is aware of the presence of an RF field on antenna 22 for charging. Switch 46 has a first terminal connected to node VRECT and a second terminal connected to a reference terminal such as ground. A control terminal of switch 46 is connected to control circuit 50.

Any nearby object changing the input impedance of antenna 16 of WLC poller device 10 by, e.g., electromagnetic coupling will cause detectable load changes that are observed in a changing input signal of WLC poller device 10. For a typical NFC device with a constant coupling to WLC poller device 10, the WLC poller device observed input signal will be constant. The proximity of a WLC listener device causes slightly different changes. The resulting observable input signal is a function of the large capacitance value of capacitor 44. If capacitor 44 is discharged and an external RF field is provided to antenna 22, it will force a large charge current resulting in a low quality factor of WLC listener device 12. If capacitor 44 is already charged, a larger equivalent quality factor can be observed. Thus, the charge state of capacitor 44 modulates the observed loading and impacts the monitored input signal of WLC poller device 10 even for a constant magnetic coupling. FIG. 3 illustrates how a charged capacitor 44 affects the loading of WLC poller device 10.

FIG. 3 illustrate a diagram of a single presence check ping from WLC poller device 10 with closely coupled WLC listener device 12. The ping has an on time labeled TRFON. The plot of the voltage at node $V_{RECT}$ is below the RF ping in FIG. 3 that depicts the effect of capacitor 44 charging on the single ping. Note that capacitor 44 in WLC listener device 12 is significantly larger than corresponding capacitors as implemented in active or passive NFC tag frontends that also include a rectifier. Examples include NFC enabled credit cards, automated fare collection (AFC) or access control cards. Therefore, the resulting change of observed antenna load of WLC poller device 10 as a result of capacitor 44 can be seen as a signature of WLC listener devices in close coupling with the WLC poller device. Also, as shown in FIG. 3, the relatively large capacitor 44 when charging causes an exponential charging curve in an input signal of WLC poller device 10. Such a drift can be used as indicator to identify a closely coupled WLC listener device.

Figure 4:
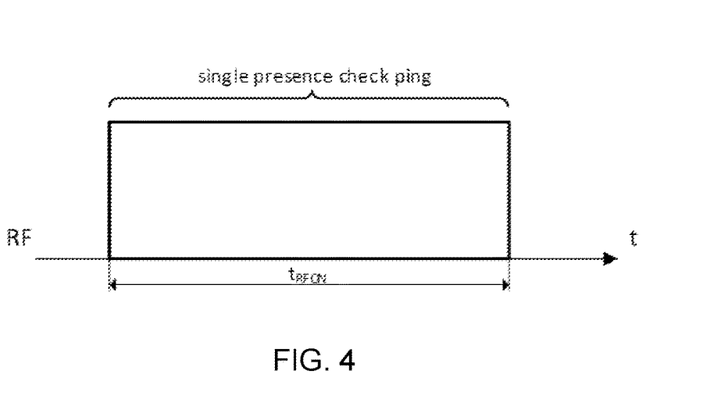
FIG. 4 illustrates a diagram of a single presence check ping without a closely coupled WLC listener device.

FIG. 4 is provided to illustrate a diagram of a single presence check ping without a closely coupled WLC listener device. There is no external influence such as a capacitance on the presence check ping.

Figure 5:
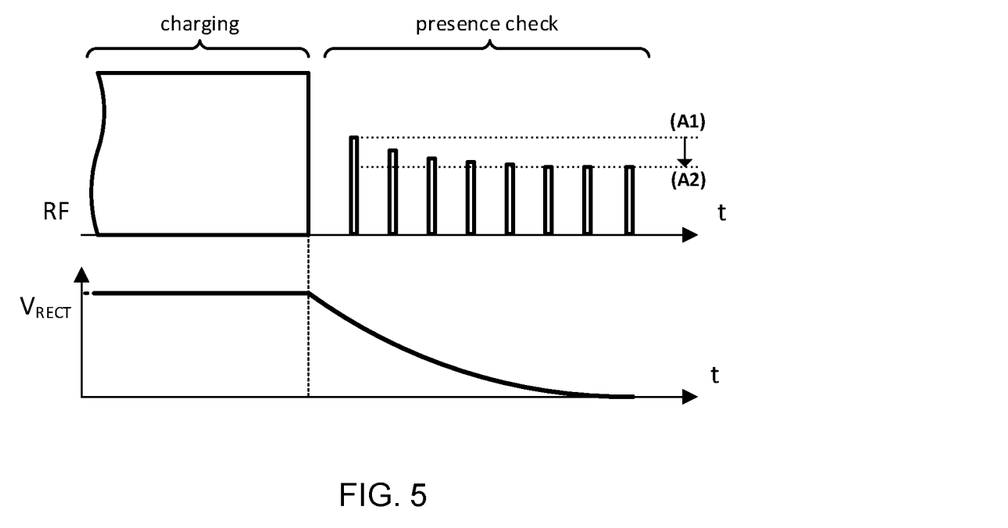
FIG. 5 illustrates a diagram of a series of presence check pings from a WLC poller device with a closely coupled WLC listener device.

FIG. 5 illustrates a diagram of a series of presence check pings from WLC poller device 10 with a closely coupled WLC listener device 12. The presence check pings immediately follow a charging period. Presence checking can be started after a charging activity is concluded and a removal detection with presence checks is performed. In this case capacitor 44 is pre-charged and is slowly discharging, which causes an observable input signal change that influences a magnitude of the series of presence check polls. The changing magnitude potentially interferes with robust detection performance. Within the first few WLC listener presence check polls a drift from ping magnitude level (A1) to (A2) can be observed. The drifting of the input signal reduces the sensitivity of presence checking and may result in misidentified detections.

Figure 6:
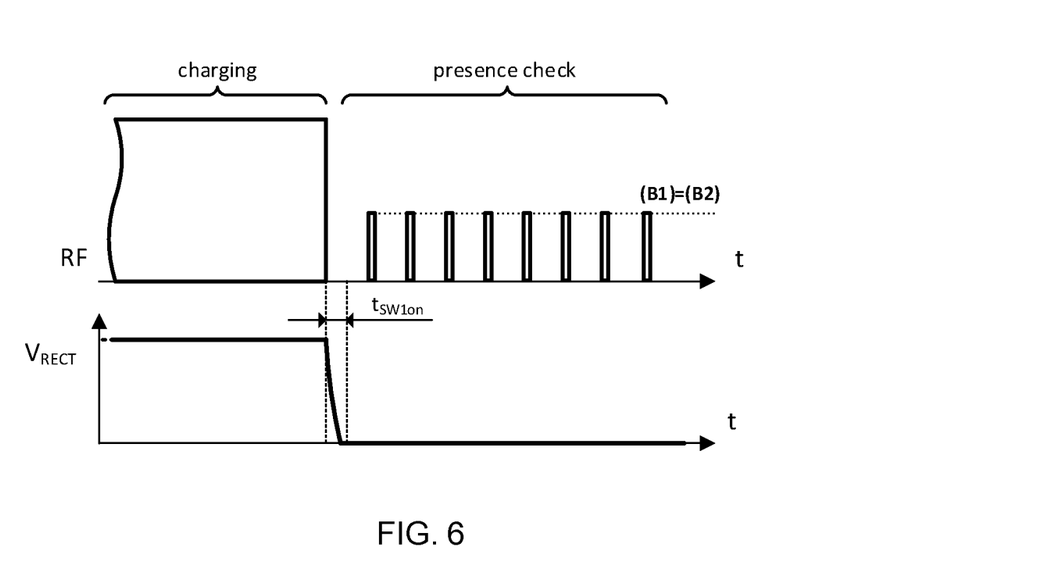
FIG. 6 illustrates a diagram of a series of presence check pings from a WLC poller device with a closely coupled WLC listener device in accordance with an embodiment.

FIG. 6 illustrates a diagram of a series of presence check pings from WLC poller device 10 with closely coupled WLC listener device 12 in accordance with an embodiment. The problem illustrated in FIG. 5 is overcome by intentionally discharging capacitor 44 by loading it strongly when an end of a charging cycle is observed. The end of the charging cycle may be reported by NFC RF frontend 52 to control circuit 50 of WLC listener device 12. In one embodiment, the connection to the load may be disabled via the charging control circuit 48 and then capacitor 44 is shorted with switch 46 to rapidly discharge capacitor 44. As can be seen in FIG. 6, within the first few WLC listener presence check polls no drift in the magnitude of the pings can be observed, e.g., (B1)=(B2), resulting in better detection robustness.

In an embodiment, probabilities can be used in presence check polls. For example, probability $P_1$ and $P_2$ are determined to provide for more robust identification of a WLC listener device. An implementation of detection probability $P_1$ may be done based on weighing, or comparing, the relative change rate of an input signal magnitude during a single WLC listener presence check poll. An implementation of detection probability $P_2$ may be done based on comparing the distance between an observed average of final input signal vectors with an expected input signal vector saved in memory 30. Both probabilities can be evaluated separately or processed in combination. A configurable required minimum detection probability threshold can be used as a decision criterion to declare the presence of WLC listener device 12. Using the probabilities $P_1$ and $P_2$ as detection criteria may improve the likelihood of correctly detecting a WLC listener device.

Figure 7:
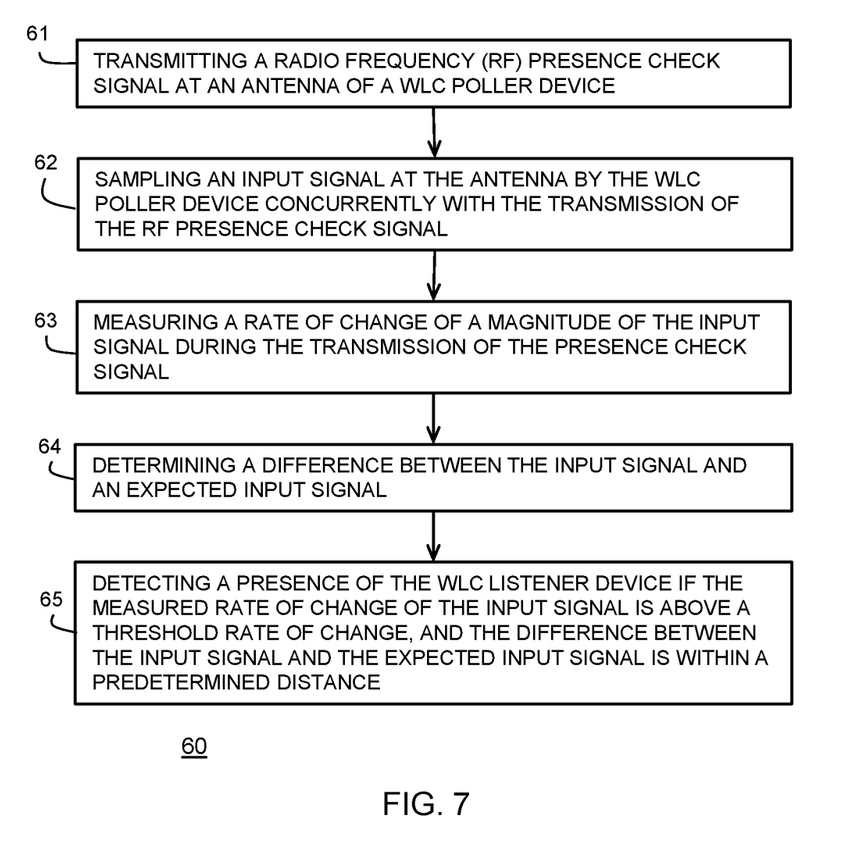
FIG. 7 illustrates a flowchart of a method for presence checking for a WLC listener device.

FIG. 7 illustrates a flowchart of method 60 for performing a presence check for a WLC listener device. Method 60 begins at step 61. At step 61, a RF presence check signal is transmitted at an antenna of a WLC poller device. At step 62, an input signal at the antenna is sampled by the WLC poller device concurrently with the transmission of the RF presence check signal. At step 63, a rate of change of a magnitude of the input signal is measured during the transmission of the presence check signal. At step 64, a difference between the input signal and an expected input signal is determined. At step 65, a presence of the WLC listener device is detected if the measured rate of change of the input is above a threshold rate of change, and the difference between the input signal and the expected input signal is within a predetermined distance.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for performing a presence check of a WLC listener device by a WLC poller device, the method comprising:
   transmitting a radio frequency (RF) presence check signal at an antenna of the WLC poller device;
   sampling a input signal from the antenna by the WLC poller device concurrently with the transmission of the RF presence check signal;
   measuring a rate of change of a magnitude of the input signal during the transmission of the presence check signal;
   determining a difference between the input signal and an expected input signal; and detecting a presence of the WLC listener device if the measured rate of change of the input signal is above a threshold rate of change, and the difference between the input signal and the expected input signal is within a predetermined range.

2. The method of claim 1, further comprising configuring an attenuator in a receiver circuit of the WLC poller device to provide uniform gain from the antenna.

3. The method of claim 1, further comprising adapting attenuation of a receiver circuit in the WLC poller based on a gain of the input signal.

4. The method of claim 1, further comprising discharging a capacitor in the WLC listener device before the RF presence check signal is transmitted.

5. The method of claim 1,
   wherein determining a difference between the input signal and the expected input signal further comprises determining a difference between an average of input signals and an expected average of input signals.

6. The method of claim 1, further comprising:
   determining that the WLC listener device is present;
   wirelessly charging the WLC listener device with the WLC poller device;
   detecting completion of the wireless charging;
   separating the WLC poller device and the WLC listener device to end the wireless charging;
   detecting removal of an input signal from a capacitor of the WLC listener device; and
   in response to detecting removal of the input signal, shorting first and second terminals of a capacitor through a switch, coupled to the first and second terminals and in parallel with the capacitor, to discharge the capacitor prior to transmission of another RF presence check signal.

7. The method of claim 1,
   further comprising identifying a WLC listener device by detecting the change in the input signal on the antenna during transmission of the presence check signal.

8. The method of claim 1,
   further comprising storing the input signal for use as the expected input signal in response to detection of the presence of the WLC listener device.

9. The method of claim 1,
   wherein the RF presence check signal and the input signal include complex vectors.

10. A wireless charging (WLC) poller device comprising:
    a transmitter circuit coupled to an antenna, the transmitter circuit configured to transmit a radio frequency (RF) presence check via the antenna;
    a receiver circuit coupled to the antenna, the receiver circuit configured to sample an input signal at the antenna concurrently with the transmission of the presence check;
    a control circuit coupled to the transmitter circuit and to the receiver circuit, the control circuit measures a rate of change of a magnitude of the input signal during the transmission of the presence check signal, determines a difference between the input signal and an expected input signal, wherein a presence of a WLC listener device is detected if the measured rate of change of the input signal is above a threshold rate of change, and the difference between the input signal and the expected input signal is within a predetermined range; and
    a memory coupled to the control circuit.

11. The WLC poller device of claim 10,
    wherein an attenuation of the receiver circuit is configured to provide uniform gain of input signals at the antenna.

12. The WLC poller device of claim 10,
    wherein an attenuation of the receiver circuit is adapted based on a gain of the input signal.

13. The WLC poller device of claim 10,
    wherein the RF presence check signal and the input signal are expressed as complex vectors.

14. The WLC poller device of claim 10,
    wherein the WLC listener device is identified by detection of a change in a input signal on the antenna during the transmission of the presence check signal.

15. The WLC poller device of claim 10,
    wherein the WLC poller device provides wireless charging according to a near field communication (NFC) protocol.

16. The WLC poller device of claim 10:
    wherein the expected input signal corresponds to an earlier seen input signal from a particular WLC listener device; and
    wherein if the difference between the input signal and the expected input signal is within the predetermined range, then the WLC poller device knows that the WLC listener device is the particular WLC listener device.

17. A wireless charging (WLC) listener device comprising:
    a receiver circuit coupled to an antenna, the receiver circuit configured to be coupled with a WLC poller device via the antenna;
    a rectifier circuit having an input coupled to the receiver circuit, the rectifier circuit configured to convert a radio frequency (RF) signal from a WLC poller device to a direct current (DC) voltage at an output of the rectifier circuit,
    wherein a capacitor having first and second terminals is coupled between the output of the rectifier circuit, and a reference terminal;
    a switch coupled to the first and second terminals and in parallel with the capacitor and having a first terminal coupled to the output of the rectifier circuit, and a second terminal coupled to the reference terminal; and
    a control circuit coupled to control operation of the WLC listener device, wherein a battery coupled to the WLC listener device is charged in response to the WLC poller device receiving a favorable response to an RF presence check signal and the WLC listener device being within a charging range, and wherein in response to the WLC listener device detecting withdraw of the WLC poller device from within the charging range, the control circuit configured to cause the switch to short the first and second terminals of the capacitor to discharge the capacitor before the WLC poller device transmits another RF presence check signal.

18. The WLC listener device of claim 17,
wherein the device is implemented on one or more integrated circuits.

19. The WLC listener device of claim 17,
wherein the device communicates with the WLC poller device using a near field communication (NFC) protocol.

20. The WLC listener device of claim 17,
wherein the RF presence check signal is expressed as a complex vector.

21. The WLC listener method of claim 17,
wherein a charging curve of the capacitor is used by the WLC poller device to identify the WLC listener device.

* * * * *